United States Patent [19]

Kaneko et al.

[11] Patent Number: 5,696,222

[45] Date of Patent: Dec. 9, 1997

[54] PROCESS FOR THE PRODUCTION OF POLYCARBONATE

[75] Inventors: Hiroaki Kaneko; Wataru Funakoshi; Katsushi Sasaki, all of Iwakuni, Japan

[73] Assignee: Teijin Limited, Osaka, Japan

[21] Appl. No.: 715,466

[22] Filed: Sep. 18, 1996

[30] Foreign Application Priority Data

| Sep. 19, 1995 | [JP] | Japan | 7-239951 |
| Mar. 5, 1996 | [JP] | Japan | 8-047387 |
| Mar. 26, 1996 | [JP] | Japan | 8-070050 |
| Apr. 12, 1996 | [JP] | Japan | 8-091000 |

[51] Int. Cl.$^6$ .................................................. C08G 64/00
[52] U.S. Cl. ........................... 528/196; 528/176; 528/180; 528/190; 528/191; 528/193; 528/194; 528/198; 528/200; 528/202
[58] Field of Search ........................... 528/176, 180, 528/190, 191, 193, 194, 200, 202, 196, 198

[56] References Cited

U.S. PATENT DOCUMENTS

| 4,310,656 | 1/1982 | Brunelle | 528/200 |
| 4,323,668 | 4/1982 | Brunelle | 528/173 |
| 4,329,443 | 5/1982 | Brunelle | 528/180 |

FOREIGN PATENT DOCUMENTS

| 63-179301 | 7/1988 | Japan . |
| 2175723 | 7/1990 | Japan . |
| 6157739 | 6/1994 | Japan . |
| 790074 | 4/1995 | Japan . |
| 7238156 | 9/1995 | Japan . |

*Primary Examiner*—Terressa Mosley
*Attorney, Agent, or Firm*—Sherman and Shalloway

[57] ABSTRACT

A process for the production of a terminal-blocked aromatic polycarbonate by melt-polycondensing an aromatic dihydroxy compound and diphenylcarbonate, the process comprising adding a specific carbonate or carboxylic ester after a polycarbonate formed has an intrinsic viscosity of at least 0.3 dl/g, to form a terminal-blocked polycarbonate having an intrinsic viscosity which is greater than, or smaller than, the intrinsic viscosity of the polycarbonate formed before the addition by 0.1 dl/g at the most; and a process for the production of a polycarbonate having an increased intrinsic viscosity by melt-polycondensing an aromatic dihydroxy compound and diphenylcarbonate, the process comprising adding a specific diaryl carbonate or dicarboxylic diaryl ester after a polycarbonate formed has an intrinsic viscosity of at least 0.3 dl/g, to form a polycarbonate having an intrinsic viscosity greater than the intrinsic viscosity of the polycarbonate formed before the addition by more than 0.1 dl/g.

15 Claims, No Drawings

PROCESS FOR THE PRODUCTION OF POLYCARBONATE

DETAILED DESCRIPTION OF THE INVENTION

The present invention relates to a process for the production of polycarbonate. More specifically, it relates to a process for the production of a polycarbonate whose terminal phenolic hydroxyl group is terminated, or whose polymerization degree is enhanced, using the reactivity of the terminal phenolic hydroxyl group of a polycarbonate.

Polycarbonate is excellent in mechanical properties such as impact resistance and is also excellent in heat resistance and transparency, and it is widely used. As a method of producing a polycarbonate, there is known a method in which phosgene is directly reacted with an aromatic diol such as bisphenol A (interfacial polymerization method) or in which an aromatic dihydroxy compound such as bisphenol and a diaryl carbonate such as diphenyl carbonate are reacted in ester exchange in a molten state (melt-polycodensation method).

Of the above methods, the method of reacting an aromatic dihydroxy compound with a diaryl carbonate in ester exchange (melt-polycodensation method) is considered promising since it advantageously does not require the use of a toxic phosgene or halogen compound such as methylene chloride as a solvent and enables the production at a low cost.

As the melt-polycodensation method having a characteristic feature in the diaryl carbonate, the following methods are known.

U.S. Pat. No. 4,310,656 discloses an improved polycarbonate transesterification process comprising reacting mixtures of bis(ortho-haloaryl)carbonate/orthohaloaryl aryl carbonate, a dihydric phenol or the like under transesterification conditions.

As a bis(ortho-haloaryl)carbonate, bis(o-chlorophenyl) carbonate, bis(o-fluorophenyl)carbonate or the like are disclosed. As an ortho-haloaryl aryl carbonate, o-chlorophenyl phenyl carbonate, o-fluorophenyl phenyl carbonate or the like are disclosed.

U.S. Pat. No. 4,329,443 discloses a polyestercarbonate transesterification process comprising reacting a bis(ortho-halo-aryl)ester, a bis(ortho-haloaryl)carbonate, a dihydric phenol or the like under transesterification reaction conditions.

As a bis(ortho-haloaryl)ester, bis(o-chlorophenyl)ester, bis(o-trifluoromethylphenyl)ester or the like are disclosed. As a bis(ortho-haloaryl)carbonate, compounds similar to those disclosed in the above U.S. Pat. No. 4,310,656 are disclosed.

U.S. Pat. No. 4,323,668 discloses a polycarbonate transesterification process comprising reacting a (ortho-alkoxycarbonylaryl)carbonate, a dihydric phenol or the like under transesterification conditions.

As an (ortho-alkoxycarbonylphenyl)carbonate, bis(o-methoxycarbonylphenyl)carbonate, bis(o-ethoxycarbonylphenyl)carbonate or the like are disclosed.

Further, when a polycarbonate is produced by a melt-copolycondensation method, attempts are made to use a terminal blocking reagent for improving the polycarbonate in polymer properties such as a hue, heat resistance and hydrolysis resistance.

JP-A 63-179301 (the term "JP-A" as used herein means an "unexamined published Japanese patent application".) discloses a bisphenol A polycarbonate whose terminal is terminated with methyl salicylate, as a basic material for an optical data recording medium.

JP-A 2-175723 discloses a process for producing a polycarbonate having a terminal hydroxyl group amount ratio of not more than 30% and an intrinsic viscosity of 0.3 to 1.0 dl/g (in methylene chloride at 20° C.), which comprises polycondensing a dihydroxy aromatic compound and a carbonic acid diester in the presence of a phenol having 10 to 40 carbon atoms. As a phenol having 10 to 40 carbon atoms, butylphenol, cumylphenol and phenylphenol are disclosed.

JP-A 6-157739 discloses a process for producing an aromatic polycarbonate by melt-polycondensing a dihydroxy aromatic compound and a carbonic acid diester in at least two serially connected reactors, in which a terminal blocking reagent is added to at least one reactor in the inlet of which the intrinsic viscosity of a polymer reaches 0.20 dl/g.

As a terminal blocking reagent, there are disclosed a carbonic acid diester having 17 to 50 carbon atoms, a carbonic acid diester having 13 to 16 carbon atoms, an epoxy compound having 2 to 50 carbon atoms and a monoester having 5 to 40 carbon atoms. However, these terminal blocking reagents do not include the terminal blocking reagent used in the present invention.

JP-A 7-238156 discloses a polycarbonate obtained by a melt-polycodensation method, which has a hydroxyl terminal amount of not more than 30 mol %, a sodium content of not more than 1 ppm and a chlorine content of not more than 20 ppm. It is disclosed that the above polycarbonate is obtained by a method in which a dihydroxy aromatic compound and carbonic acid diester are melt-polycondensed in the presence of a phenol having 10 to 40 carbon atoms or a carbonic acid diester having 17 to 50 carbon atoms. However, the terminal blocking reagent used in the present invention is not at all included among compounds disclosed as examples of the above compounds.

Further, there is known a method of obtaining a polycarbonate having an enhanced polymerization degree by adding a certain compound to the reaction system when a polycarbonate is produced by an ester exchange method.

JP-A 7-90074 discloses a method of producing a polycarbonate from a dihydric compound and a carbonic acid diester by an ester exchange method, in which a highly active diester, acid halide or acid anhydride with at least two functional groups is added after the ester exchange ratio exceeds 70% to obtain a polycarbonate having an enhanced polymerization degree.

As the above active diester, there are disclosed carbonate compounds such as bis(4-nitrophenyl)carbonate and carboxylic acid esters such as terephthalic acid bis(4-cyanophenyl)ester. However, the dicarbonate compound specifically used in the present invention is not at all included in compounds disclosed as examples.

It is therefore an object of the present invention to provide a process for the production of a polycarbonate whose terminal hydroxyl group is terminated, or whose polymerization degree is enhanced, using the reactivity of terminal phenolic hydroxyl group of a polycarbonate by a melt-polycondensation method.

It is another object of the present invention to provide a process for the production of a polycarbonate, in which at least part of phenolic hydroxyl groups of a polycarbonate is rapidly blocked and the polycarbonate therefore can be fully modified, for example, so as to have excellent releasability.

It is further another object of the present invention to provide a process for the production of a polycarbonate which is excellent in hue, can control residual phenols derived from a terminal blocking reagent at a low level and is stabilized.

It is further another object of the present invention to provide a process for the expeditious production of a polycarbonate having an enhanced polymerization degree by a melt polycondensation method.

It is further another object of the present invention to provide a process for producing a polycarbonate having an excellent hue and an enhanced polymerization degree with a high productivity and at a low cost.

Other objects and advantages of the present invention will be apparent from the following description.

According to the present invention, the above objects and advantages of the present invention will be achieved, first, by a process for the production of a terminal-blocked aromatic polycarbonate by melt-polycondensing an aromatic dihydroxy compound and diphenylcarbonate, the process comprising adding a compound of the formula (1),

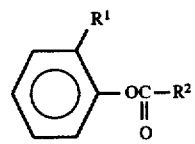 (1)

wherein $R^1$ is a chlorine atom, a methoxycarbonyl group or an ethoxycarbonyl group, and $R^2$ is an alkyl group having 1 to 30 carbon atoms, an alkoxyl group having 1 to 30 carbon atoms, an aryl group having 6 to 30 carbon atoms or an aryloxy group having 6 to 30 carbon atoms, provided that the alkyl group having 1 to 30 carbon atoms and the alkoxy group having 1 to 30 carbon atoms may be substituted with methoxycarbonyl group, ethoxycarbonyl group, (o-methoxycarbonylphenyl)oxycarbonyl group or (o-ethoxycarbonylphenyl)oxycarbonyl group and that the aryl group having 6 to 30 carbon atoms and the aryloxy group having 6 to 30 carbon atoms may be substituted with methoxycarbonyl group, ethoxycarbonyl group, (o-methoxycarbonylphenyl)oxycarbonyl group, (o-ethoxycarbonylphenyl)oxycarbonyl group, an alkyl group having 1 to 30 carbon atoms or an alkoxy group having 1 to 30 carbon atoms, after a polycarbonate formed has an intrinsic viscosity of at least 0.3 dl/g, to form a terminal-blocked polycarbonate having an intrinsic viscosity which is greater than, or smaller than, the intrinsic viscosity of the polycarbonate formed before the addition by 0.1 dl/g at the most. In other words, when the intrinsic viscosity of the polycarbonate formed before the addition is designated as "x" and that of the terminal-blocked polycarbonate after addition is designated as "y", the reltionship between "x" and "y" is shown by the following expression $x-0.1 \leq y \leq x+0.1$.

The compound of the above formula (1) used in the present invention includes carbonates and carboxylic acid aryl esters depending upon the definition of $R^2$.

In the formula (1), $R^1$ is a chlorine atom, methoxycarbonyl ($CH_3OCO-$) group or ethoxycarbonyl ($C_2H_5OCO-$) group. $R^1$ is preferably a chlorine atom or methoxycarbonyl group, particularly preferably methoxycarbonyl group.

$R^2$ is an alkyl group having 1 to 30 carbon atoms, an alkoxy group having 1 to 30 carbon atoms, an aryl group having 6 to 30 carbon atoms or an aryloxy group having 6 to 30 carbon atoms.

The alkyl group having 1 to 30 carbon atoms may be any one of linear, branched and cyclic alkyl groups. It may also have an unsaturated group. Examples of the alkyl group includes linear alkyl groups such as methyl, ethyl, n-propyl, n-butyl, n-pentyl, n-hexyl, n-octyl, n-nonyl, n-decanyl, n-lauryl, n-palmityl and stearyl; branched alkyl groups such as isopropyl, t-butyl and 4-butylnonyl; alkyl groups having an unsaturated groups, i.e., alkenyl groups, such as allyl, butenyl, pentenyl, hexenyl, dodecenyl and oleyl; and cycloalkyl groups such as cyclopentyl and cyclohexyl. Of these, long-chain alkyl groups such as lauryl, stearyl and dodecenyl are preferred in view of an improvement in the releasability of the polymer.

The alkoxyl group having 1 to 30 carbon atoms may be any one of linear, branched and cyclic alkoxyl groups, and it may have an unsaturated group. Examples of the alkoxyl group includes linear alkoxyl groups such as methoxy, ethoxy, n-propoxy, n-butoxy, n-pentoxy, n-hexoxy, n-octoxy, n-nonyloxy, n-decanyloxy, n-lauryloxy, n-palmityloxy and stearyloxy; branched chain-like alkoxyl groups such as iso-propyloxy, t-butyloxy and 4-butylnonyloxy; alkoxy groups having an unsaturated group such as allyloxy, butenyloxy, pentenyloxy, hexenyloxy, dodecenyloxy and oleyloxy; and cycloalkyloxy groups such as cyclopentyloxy and cyclohexyloxy. Of these, a long-chain alkoxyl groups such as lauryloxy, stearyloxy and dodecenyloxy are preferred in view of an improvement in the releasability of the polymer.

The above alkyl group having 1 to 30 carbon atoms and the above alkoxyl group having 1 to 30 carbon atoms may be substituted with methoxycarbonyl, ethoxycarbonyl, (o-methoxycarbonylphenyl)oxycarbonyl

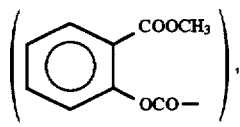

or (o-ethoxycarbonylphenyl)oxycarbonyl

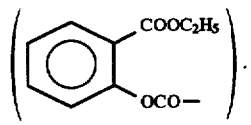

The aryl group having 6 to 30 carbon atoms includes phenyl, naphthyl, biphenyl and anthranyl.

The aryloxy group having 6 to 30 carbon atoms includes phenoxy, naphthoxy, biphenyloxy and anthranyloxy.

The above aryl group having 6 to 30 carbon atoms and the above aryloxy group having 6 to 30 carbon atoms may be substituted with methoxycarbonyl, ethoxycarbonyl, (o-methoxycarbonylphenyl)oxycarbonyl, (o-ethoxycarbonyl-phenyl)oxycarbonyl, an alkyl group having 1 to 30 carbon atoms or an alkoxyl group having 1 to 30 carbon atoms.

The alkyl group having 1 to 30 carbon atoms and the alkoxyl group having 1 to 30 carbon atoms are those which are already specified above.

Depending upon the definition of $R^2$, the compound of the above formula (1) can be classified into a carbonate compound of the following formula (1)-1,

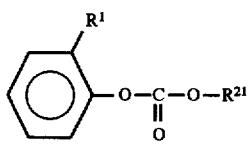 (1)-1 wherein R¹ is as defined in the formula (1), R²¹ is an alkyl group having 1 to 30 carbon atoms or an aryl group having 6 to 30 carbon atoms, and these groups may be substituted with a substituent specified concerning the definition of the formula (1),
and a carboxylic acid aryl ester of the following formula (1)-2,

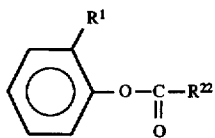 (1)-2 wherein R¹ is as defined in the formula (1), R²² is an alkyl group having 1 to 30 carbon atoms or an aryl group having 6 to 30 carbon atoms, and these groups may be substituted with a substituent specified concerning the definition of the formula (1).

The carbonate compound of the above formula (1)-1 includes 2-chlorophenyl-arylcarbonates such as 2-chlorophenyl-phenylcarbonate, 2-chlorophenyl-4'-methylphenylcarbonate, 2-chlorophenyl-4'-ethylphenylcarbonate, 2-chlorophenyl-4'-n-butylphenylcarbonate, 2-chlorophenyl-4'-t-butylphenylcarbonate, 2'-chlorophenyl-4'-nonylphenylcarbonate, 2-chlorophenyl-4'-cumylphenylcarbonate, 2-chlorophenyl-naphthylcarbonate, 2-chlorophenyl-4'-methoxyphenylcarbonate, 2-chlorophenyl-4'-ethoxyphenylcarbonate, 2-chlorophenyl-4'-n-butoxyphenylcarbonate, 2-chlorophenyl-4'-t-butoxyphenylcarbonate, 2-chlorophenyl-4'-nonyloxyphenylcarbonate, 2-chlorophenyl-4'-i-propyloxyphenylcarbonate, 2-chlorophenyl-2'-methoxycarbonylphenylcarbonate, 2-chlorophenyl-4'-methoxycarbonylphenylcarbonate, 2-chlorophenyl-2'-ethoxycarbonylphenylcarbonate, 2-chlorophenyl-4'-ethoxycarbonylphenylcarbonate, 2-chlorophenyl-2'-(o-methoxycarbonylphenyl)oxycarbonylphenylcarbonate, and 2-chlorophenyl-2'-(o-ethoxycarbonylphenyl)oxycarbonylphenylcarbonate; 2-chlorophenyl-alkylcarbonates such as 2-chlorophenyl-methylcarbonate, 2-chlorophenylethylcarbonate, 2-chlorophenyl-n-butylcarbonate, 2-chlorophenyl-octylcarbonate, 2-chlorophenyl-i-propylcarbonate, 2-chlorophenyl-2-methoxycarbonylethylcarbonate, 2-chlorophenyl-2-ethoxycarbonylethylcarbonate, 2-chlorophenyl-2-(o-methoxycarbonylphenyl)oxycarbonylethylcarbonate, and 2-chlorophenyl-2-(o-ethoxycarbonylphenyl)oxycarbonylethylcarbonate; 2-methoxycarbonylphenylarylcarbonates such as 2-methoxycarbonylphenylphenylcarbonate, 2-methoxycarbonylphenyl-4'-methylphenylcarbonate, 2-methoxycarbonylphenyl-4'-ethylphenylcarbonate, 2-methoxycarbonylphenyl-4'-propylphenylcarbonate, 2-methoxycarbonylphenyl-n-4'-butylphenylcarbonate, 2-methoxycarbonylphenyl-t-4'-butylphenylcarbonate, 2-methoxycarbonylphenyl-4'-hexylphenylcarbonate, 2-methoxycarbonylphenyl-4'nonylphenylcarbonate, 2-methoxycarbonylphenyl-4'-dodecylphenylcarbonate, 2-methoxycarbonylphenyl-4'hexadecylphenylcarbonate, 2-methoxycarbonylphenyl-3',5'-di-n-butylphenylcarbonate, 2-methoxycarbonylphenyl-3',5'-di-t-butylphenylcarbonate, 2-methoxycarbonylphenyl-3',5'-dinonylphenylcarbonate, 2-methoxycarbonylphenyl-4'-cyclohexylphenylcarbonate, 2-methoxycarbonylphenyl-4'-naphthylphenylcarbonate, 2-methoxycarbonylphenyl-4'-biphenylcarbonate, 2-methoxycarbonylphenyl-4'-cumylphenylcarbonate, 2-methoxycarbonylphenyl-4'-methoxyphenylcarbonate, 2-methoxycarbonylphenyl-4'-ethoxyphenylcarbonate, 2-methoxycarbonylphenyl-4'-n-butoxyphenylcarbonate, 2-methoxycarbonylphenyl-4'-t-butoxyphenylcarbonate, 2-methoxycarbonylphenyl-4'-nonyloxyphenylcarbonate, 2-methoxycarbonylphenyl-4'-cumyloxyphenylcarbonate, bis(2-methoxycarbonylphenyl)carbonate, 2-methoxycarbonylphenyl-4'-methoxycarbonylphenylcarbonate, 2-methoxycarbonylphenyl-2'-ethoxycarbonylphenylcarbonate, 2-methoxycarbonylphenyl-4'-ethoxycarbonylphenylcarbonate, 2-methoxycarbonylphenyl-2'-(o-methoxycarbonylphenyl)oxycarbonylphenylcarbonate and 2-methoxycarbonylphenyl-2'-(o-ethoxycarbonylphenyl)oxycarbonylphenylcarbonate; 2-methoxycarbonylphenylalkylcarbonates such as 2-methoxycarbonylphenylmethylcarbonate, 2-methoxycarbonylphenyl-ethylcarbonate, 2-methoxycarbonylphenyl-n-butylcarbonate, 2-methoxycarbonylphenyl-octylcarbonate, 2-methoxycarbonylphenyl-nonylcarbonate, 2-methoxycarbonylphenyl-cetylcarbonate, 2-methoxycarbonylphenyl-laurylcarbonate, 2-methoxycarbonylphenyl-2-methoxycarbonylethylcarbonate, 2-methoxycarbonylphenyl-2-ethoxycarbonylethylcarbonate, 2-methoxycarbonylphenyl-2-(o-methoxycarbonylphenyl)oxycarbonylethylcarbonate and 2-methoxycarbonylphenyl-2-(o-ethoxycarbonylphenyl)oxycarbonylethylcarbonate; 2-ethoxycarbonylphenyl-arylcarbonates such as 2-ethoxycarbonylphenyl-phenylcarbonate, 2-ethoxycarbonylphenyl-4'-methylphenylcarbonate, 2-ethoxycarbonylphenyl-4'-ethylphenylcarbonate, 2-ethoxycarbonylphenyl-4'-propylphenylcarbonate, 2-ethoxycarbonylphenyl-4'-n-butylphenylcarbonate, 2-ethoxycarbonylphenyl-4'-t-butylphenylcarbonate, 2-ethoxycarbonylphenyl-4'-hexylphenylcarbonate, 2-ethoxycarbonylphenyl-4'-nonylphenylcarbonate, 2-ethoxycarbonylphenyl-4'-dodecylphenylcarbonate, 2-ethoxycarbonylphenyl-4'-hexadecylphenylcarbonate, 2-ethoxycarbonylphenyl-3',5'-di-n-butylphenylcarbonate, 2-ethoxycarbonylphenyl-3',5'-di-t-butylphenylcarbonate, 2-ethoxycarbonylphenyl-3',5'-dinonylphenylcarbonate, 2-ethoxycarbonylphenyl-4'-cyclohexylphenylcarbonate, 2-ethoxycarbonylphenyl-4'-naphthylphenylcarbonate, 2-ethoxycarbonylphenyl-4'-biphenylcarbonate, 2-ethoxycarbonylphenyl-4'-cumylphenylcarbonate, 2-ethoxycarbonylphenyl-4'-methoxyphenylcarbonate, 2-ethoxycarbonylphenyl-4'-ethoxyphenylcarbonate, 2-ethoxycarbonylphenyl-4'-n-butoxyphenylcarbonate, 2-ethoxycarbonylphenyl- 4'-t-butoxyphenylcarbonate, 2-ethoxycarbonylphenyl-4'-nonyloxyphenylcarbonate, 2-ethoxycarbonylphenyl-4'-cumyloxyphenylcarbonate, di(2-ethoxycarbonylphenyl)carbonate, 2-ethoxycarbonylphenyl-4'-methoxycarbonylphenylcarbonate, 2-ethoxycarbonylphenyl-4'-ethoxycarbonylphenylcarbonate, 2-ethoxycarbonylphenyl-2'-(o-methoxycarbonylphenyl)- oxycarbonylphenylcarbonate and 2-ethoxycarbonylphenyl-2'-(o-ethoxycarbonylphenyl)oxycarbonylphenylcarbonate; and 2-ethoxycarbonylphenyl-alkylcarbonates such as 2-ethoxycarbonylphenyl-methylcarbonate, 2-ethoxycarbonylphenyl-ethyl carbonate,2-ethoxycarbonylphenyl-n-butylcarbonate, 2-ethoxycarbonylphenyl-octylcarbonate, 2-ethoxycarbonylphenyl-2-methoxycarbonylethylcarbonate, 2-ethoxycarbonylphenyl-2-ethoxycarbonylethylcarbonate, 2-ethoxycarbonylphenyl-2-(o-methoxycarbonylphenyl)oxycarbonylmethylcarbonate and 2-ethoxycarbonylphenyl-2-(o-ethoxycarbonylphenyl) oxycarbonylethylcarbonate. Among these, 2-methoxycarbonylphenyl-phenylcarbonate and 2-methoxycarbonylphenyl-4'-cumylphenylcarbonate is particularly excellent in resistance to hydrolysis (resistance to wettability) since its terminals are highly blocked by phenl or cumylphenyl groups.

The carboxylic acid aryl ester of the above formula (1)-2 includes aromatic acid 2-chlorophenyl esters such as 2-chlorophenyl benzoate, 2-chlorophenyl 4'-methylbenzoate, 2-chlorophenyl 4'-ethylbenzoate, 2-chlorophenyl 4'-n-butylbenzoate, 2-chlorophenyl 4'-t-butylbenzoate, 2-chlorophenyl 4'-nonylbenzoate, 2-chlorophenyl 4'-cumylbenzoate, 2-chlorophenyl naphthoate, 2-chlorophenyl 4'-methoxybenzoate, 2-chlorophenyl 4'-ethoxybenzoate, 2-chlorophenyl 4'-n-butoxybenzoate, 2-chlorophenyl 4'-t-butoxybenzoate, 2-chlorophenyl 4'-nonyloxybenzoate, 2-chlorophenyl 4'-cumyloxybenzoate, 2-chlorophenyl 2-methoxycarbonylbenzoate, 2-chlorophenyl 4'-methoxycarbonylbenzoate, 2-chlorophenyl 2'-ethoxycarbonylbenzoate, 2-chlorophenyl 4'-ethoxycarbonylbenzoate, 2-chlorophenyl 2'-(o-methoxycarbonylphenyl)oxycarbonylbenzoate and 2-chlorophenyl 2'-(o-ethoxycarbonylphenyl) oxycarbonylbenzoate; aliphatic carboxylic acid 2-chlorophenyl esters such as 2-chlorophenyl acetate, 2-chlorophenyl propionate, 2-chlorophenyl valerate, 2-chlorophenyl pelargonate, 2-chlorophenyl 1'-methylpropionate, 2-chlorophenyl2'methoxycarbonylpropionate, 2-chlorophenyl 2'-ethoxycarbonyl butylate, 2-chlorophenyl 4'-(2-methoxycarbonyl-phenyl)oxycarbonyl butylate and 2-chlorophenyl 4'-(2-ethoxycarbonylphenyl)oxycarbonyl butylate; aromatic carboxylic acid-(2'-methoxycarbonylphenyl)esters such as (2-methoxycarbonylphenyl)benzoate, 4-methylbenzoyl-(2'-methoxycarbonylphenyl)ester, 4-ethylbenzoyl-(2'-methoxycarbonylphenyl)ester, 4-n-butylbenzoyl-(2'-methoxycarbonylphenyl)ester, 4-t-butylbenzoyl-(2'-methoxycarbonylphenyl)ester, (2'-methoxycarbonylphenyl) naphthoate, (2'-methoxycarbonylphenyl) 4-nonylbenzoate, (2'-methoxycarbonylphenyl) 4-cumylbenzoate, (2'-methoxycarbonylphenyl) 4-methoxybenzoate, (2'-methoxycarbonylphenyl) 4-ethoxybenzoate, (2'-methoxycarbonylphenyl) 4-n-butoxybenzoate, (2'-methoxycarbonylphenyl) 4-t-butoxybenzoate, (2'-methoxycarbonylphenyl) 4-nonyloxybenzoate, (2'-methoxycarbonylphenyl) 4-cumyloxybenzoate, (2'-methoxycarbonylphenyl) 2-methoxycarbonylbenzoate, (2'-methoxycarbonylphenyl) 4-methoxycarbonylbenzoate, (2'-methoxycarbonylphenyl) 4-ethoxycarbonylbenzoate, (2'-methoxycarbonylphenyl) 3-(o-methoxycarbonylphenyl) oxycarbonylbenzoate, (2'-methoxycarbonylphenyl) 4-(o-methoxycarbonylphenyl)oxycarbonylbenzoate and (2'-methoxycarbonylphenyl) 3-(o-ethoxycarbonylphenyl) oxycarbonylbenzoate; and aromatic carboxylic acid-(2'-ethoxycarbonylphenyl)esters such as (2-ethoxycarbonylphenyl)benzoate, 4-methylbenzoyl-(2'-ethoxycarbonylphenyl)ester, 4-ethylbenzoyl-(2'-ethoxycarbonylphenyl)ester, 4-n-butylbenzoyl-(2'-ethoxycarbonylphenyl)ester, 4-t-butylbenzoyl-(2'-ethoxycarbonylphenyl)ester, (2,-ethoxycarbonylphenyl) naphthoate, (2'-ethoxycarbonylphenyl) 4-nonylbenzoate, (2'-ethoxycarbonylphenyl) 4-cumylbenzoate, (2'-ethoxycarbonylphenyl) 4-methoxybenzoate, (2'-ethoxycarbonylphenyl) 4-ethoxybenzoate, (2'-ethoxycarbonylphenyl) 4-n-butoxybenzoate, (2'-ethoxycarbonylphenyl) 4-t-butoxybenzoate, (2'-ethoxycarbonylphenyl) 4-nonyloxybenzoate, (2'-ethoxycarbonylphenyl) 4-cumyloxybenzoate, (2'-ethoxycarbonylphenyl) 2-methoxycarbonylbenzoate, (2'-ethoxycarbonylphenyl) 4-methoxycarbonylbenzoate, (2'-ethoxycarbonylphenyl) 4-ethoxycarbonylbenzoate, (2'-ethoxycarbonylphenyl) 3-(o-methoxycarbonylphenyl) oxycarbonylbenzoate, (2'-ethoxycarbonylphenyl) 4-(o-methoxycarbonylphenyl)oxycarbonylbenzoate and (2'-ethoxycarbonylphenyl) 3-(o-ethoxycarbonylphenyl) oxycarbonylbenzoate.

As a compound of the formula (1), particularly preferred are (2-methoxycarbonylphenyl)benzoate, (2'-methoxycarbonylphenyl) 4-cumylbenzoate, (2-ethoxycarbonylphenyl)benzoate and (2'-methoxycarbonylphenyl) 4-(o-methoxycarbonylphenyl) oxycarbonylbenzoate.

In the process of the present invention, the compound of the formula (1) is added to a polycarbonate, and as shown in the following reaction scheme, it reacts with a terminal hydroxyl group (~OH) of the polycarbonate to block the terminal of the polycarbonate.

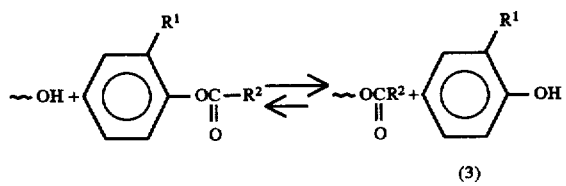

(3)

For expediting the terminal blocking at high yields, therefore, it is preferred to carry out the process of the present invention with distilling off the formed 2-substituted phenol.

The compound of the above formula (1) is added after a polycarbonate formed by melt-polycondensation of an aromatic dihydroxy compound and a diphenylcarbonate has an intrinsic viscosity of at least 0.3 dl/g. After the addition, the terminal blocking of the polycarbonate promptly proceeds, and hence, the intrinsic viscosity of the polycarbonate changes by 0.1 dl/g at the highest.

The compound of the above formula (1) is used in an amount of preferably about 0.5 to about 2.0 mol, more preferably about 0.7 to about 1.5 mol, particularly preferably about 0.8 to about 1.2 mol, based on 1 equivalent of terminal hydroxyl group of the polycarbonate.

The aromatic dihydroxy compound used in the present invention is preferably a compound of the following formula (4), for example.

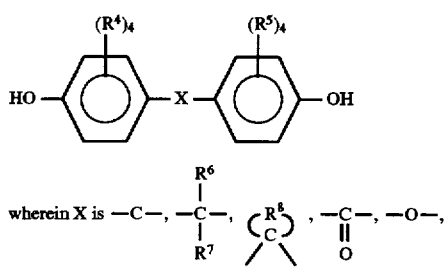

(4)

wherein X is —C—, —C—, ⟨R⁸ C⟩, —C—, —O—,
        |    |         ||
        R⁶   R⁷        O —S—, —SO₂—, —SO— or a direct bond, each of R⁴ and R⁵ is independently a hydrogen atom, a halogen atom or a hydrocarbon group having 1 to 12 carbon atoms, each of R⁶ and R⁷ is independently a hydrogen atom or a hydrocarbon group having 1 to 12 carbon atoms, and R⁸ is an alkylene group having 2 to 7 carbon atoms.

In the above formula (4), the halogen atom is preferably selected from chlorine and fluorine. The hydrocarbon group having 1 to 12 carbon atoms is preferably selected from an aliphatic hydrocarbon group having 1 to 12 carbon atoms or an aromatic hydrocarbon group having 6 to 12 carbon atoms.

Specific examples of the above aromatic dihydroxy compound include bis(hydroxyaryl)alkanes such as 1,1-bis(4'-hydroxy-t-butylphenyl)propane, 2,2-bis(4'-hydroxyphenyl) propane and 2,2-bis(4'-hydroxybromophenyl)propane; bis (hydroxyaryl)cycloalkanes such as 1,1-bis(4'-hydroxyphenyl)cyclopentane and 1,1-bis(4'-hydroxyphenyl) cyclohexane; dihydroxyaryl ethers such as 4,4'-dihydroxydiphenyl ether and 4,4'-dihydroxy-3,3'-dimethylphenyl ether; dihydroxyaryl sulfides such as 4,4'-dihydroxydiphenyl sulfide and 4,4'-dihydroxy-3,3'-dimethylphenyl sulfide; dihydroxyaryl sulfoxides such as 4,4'-dihydroxydiphenyl sulfoxide and 4,4'-dihydroxy-3,3'-dimethylphenyl sulfoxide; and dihydroxyaryl sulfones such as 4,4'-dihydroxydiphenyl sulfone and 4,4'-dihydroxy-3,3'-dimethylphenyl sulfone.

Of the above compounds, 2,2-bis(4'-hydroxyphenyl) propane (bisphenol A) is particularly preferred. The above compounds may be used alone or in combination.

In the melt-polycondensation, the diphenylcarbonate is used in an excess amount based on the aromatic dihydroxy compound, preferably in an amount of 1.01 to 1.20 mol per mole of the aromatic dihydroxy compound.

In the present invention, the polycarbonate before blocking the terminal is produced by polycondensation, preferably, in the presence of (i) an alkali metal compound and/or (ii) a nitrogen-containing basic compound as a catalyst.

The alkali metal compound used as a catalyst includes hydroxides, hydrogencarbonates, carbonates, acetates, nitrates, nitrites, sulfites, cyanates, thiocyanates, stearates, borohydrides, benzoates, hydrogenphosphates, bisphenol salts and phenol salts of alkali metals.

Specific examples of the alkali metal compound include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium nitrate, potassium nitrate, lithium nitrate, sodium nitrite, potassium nitrite, lithium nitrite, sodium sulfite, potassium sulfite, lithium sulfite, sodium cyanate, potassium cyanate, lithium cyanate, sodium thiocyanate, potassium thiocyanate, lithium thiocyanate, sodium stearate, potassium stearate, lithium stearate, sodium borohydride, potassium borohydride, lithium borohydride, sodium benzoate, potassium benzoate, lithium benzoate, disodium hydrogenphosphate, dipotassium hydrogenphosphate, dilithium hydrogenphosphate, disodium salt, dipotassium salt and dilithium salts of bisphenol A, and sodium salt, potassium salt and lithium salt of phenol.

The alkali metal compound as a catalyst may be used in an amount of $10^{-8}$ to $10^{-5}$ mol per mole of the aromatic dihydroxy compound. When the amount of the alkali metal compound is out of the above range, undesirably, the properties of the polycarbonate as an end product are affected, or the ester exchange reaction does not fully proceed so that no polycarbonate having a high molecular weight can be obtained.

The nitrogen-containing basic compound as a catalyst includes ammonium hydroxides having an alkyl, aryl or araryl group such as tetramethylammonium hydroxide (Me₄NOH), tetraethylammonium hydroxide (Et₄OH), tetrabutylammonium hydroxide (Bu₄NOH), benzyltrimethylammonium hydroxide (φCH₂(Me)₃NOH) and hexadecyltrimethylammonium hydroxide; tertiary amines such as triethylamine, tributylamine, dimethylbenzylamine and hexadecyldimethylamine; and basic salts such as tetramethylammonium borohydride (Me₄NBH₄), tetrabutylammoniumborohydride (Bu₄NBH₄), tetrabutylammonium tetraphenylborate (Bu₄NBPh₄) and tetramethylammonium tetraphenylborate (Me₄NBPh₄).

The above nitrogen-containing basic compound is preferably used in such an amount that the content of the ammonium nitrogen atom of the nitrogen-containing basic compound is $1\times10^{-5}$ to $1\times10^{-3}$ equivalent per mole of the aromatic dihydroxy compound. More preferably, the nitrogen-containing basic compound is used in such an amount that the content of the ammonium nitrogen atom is $2\times10^{-5}$ to $7\times10^{-4}$ equivalent based on the same standard, and particularly preferably, it is used in such an amount that the content of the ammonium nitrogen atom is $5\times10^{-5}$ to $5\times10^{-4}$ equivalent based on the same standard.

In the present invention, the alkali metal compound used as a catalyst may be selected from (a) an alkali metal salt of the ate complex of an element coming under the group 14 of the periodic table or (b) an alkali metal salt of oxoacid of an element coming under the group 14 of the periodic table as required. The element coming under the group 14 of the periodic table includes silicon, germanium and tin.

When the above alkali metal compound is used as a catalyst in the polycondensation and in the terminal blocking reaction, it can advantageously serve to rapidly and fully proceed with the polycondensation and the terminal blocking reaction. Further, undesirable side reactions such as a branch-forming reaction can be maintained at a low level during the polycondensation.

The (a) an alkali metal salt of the ate-complex of an element coming under the group 14 of the periodic table refers to those described in JP-A 7-268091. Specific examples thereof include germanium (Ge) compounds such as NaGe(OMe)₅, NaGe(OEt)₃, NaGe(OPr)₅, NaGe(OBu)₅, NaGe(OPh)₅, LiGe(OMe)₅, LiGe(OBu)₅ and LiGe(OPh)₅, and tin (Sn) compounds such as NaSn(OMe)₃, NaSn(OMe)₂(OEt), NaSn(OPr)₃, NaSn(o-n-C₆H₁₃)₃, NaSn(OMe)₅, NaSn(OEt)₅, NaSn(OBu)₅, NaSn(o-n-C₁₂H₂₅)₅, NaSn (OEt), NaSn(OPh)₅ and NaSnBu₂(OMe)₃.

The (b) an alkali metal salt of oxoacid of an element coming under the group 14 of the periodic table preferably includes alkali metal salt of silicic acid, alkali metal salt of stanic acid, alkali metal salt of germanous acid and alkali metal salt of germanic acid.

The alkali metal salt of silicic acid refers, for example, to acidic or neutral alkali metal salt of monosilicic acid or a condensate thereof, such as monosodium orthosilicate, disodium orthosilicate, trisodium orthosilicate and tetrasodium orthosilicate.

The alkali metal salt of stanic acid refers, for example, to acidic or neutral alkali metal salt of monostanic acid or a condensate thereof, such as disodium monostanate ($Na_2SnO_3$) and tetrasodium monostanate ($Na_4SnO_4$).

The alkali metal salt of germanous acid refers, for example, to acidic or neutral alkali metal salt of monogermanous acid or a condensate thereof, such as monosodium salt of germanous acid ($NaHGeO_2$).

The alkali metal salt of germanic acid refers, for example, to acidic or neutral alkali metal salt of monogermanic acid or a condensate thereof, such as monolithium orthogermanate ($LiH_3GeO_4$), disodium orthogermanate, tetrasodium orthogermanate, disodium digermanate ($Na_2Ge_2O_5$), disodium tetragermanate ($Na_2Ge_4O_9$) and disodium pentagermanate ($Na_2Ge_5O_{11}$).

The above catalyst for the polycondensation is preferably used in such an amount that the alkali metal element content in the catalyst is $1 \times 10^{-7}$ to $5 \times 10^{-5}$ equivalent per mole of the aromatic dihydroxy compound. The catalyst is more preferably used in such an amount that the alkali metal element content in the catalyst is $5 \times 10^{-7}$ to $1 \times 10^{-5}$ equivalent based on the same standard.

In the present invention, the polycondensation may be carried out in the co-presence of at least one co-catalyst selected from the group consisting of oxoacids of elements coming under the group 14 of the periodic table and oxides of these elements.

The use of the above co-catalyst in a specific amount can effectively prevent the branch-forming reaction which is liable to take place during the polycondensation and undesirable side reactions such as the formation of foreign matter in an apparatus and yellowing during molding without impairing the terminal blocking reaction and the reaction rate of the polycondensation.

The oxoacid of an element coming under the group 14 of the periodic table includes silicic acid, stanic acid and germanic acid.

The oxides of an element coming under the group 14 of the periodic table includes silicon monoxide, silicon dioxide, tin monoxide, tin dioxide, germaniummenoxide, germanium dioxide and a condensate of any one of these.

The co-catalysts is used preferably in such an amount that the content of the metal element coming under the group 14 of the periodic table is not more than 50 mol (atom) per mole (atom) of the alkali metal element in the catalyst for polycondensation. When the co-catalyst is used in such an amount that the content of the above metal element exceeds 50 mol (atom), undesirably, the reaction rate of the polycondensation is low.

The co-catalyst is used more preferably in such an amount that the content of the metal element coming under the group 14 of the periodic table is 0.1 to 30 mol (atom).

Studies of the present inventors have revealed the following. When the below-specified catalyst neutralizing agent is used, the catalyst remaining in a polymer whose terminal is fully blocked can be effectively and fully neutralized, and even after the catalyst is neutralized, the polymer has an excellent hue and is stabilized.

In the present invention, after the polymer is terminal-blocked, it is preferred to add, as a catalyst neutralizing agent, at least one compound selected from the group consisting of compounds of the following general formulae (I) to (IV) at a concentration of 0.01 to 500 ppm based on the polycarbonate to be formed while the polymer is in a molten state.

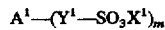

$$A^1—(Y^1—SO_3X^1)_m \quad (I)$$

wherein $A^1$ is a hydrocarbon group having a valence of m, which may have a substituent, $Y^1$ is a single bond or an oxygen atom, $X^1$ is a secondary or tertiary hydrocarbon group having a valence of 1 or a 1-equivalent metal cation, ammonium cation or phosphonium cation, and m is an integer of 1 to 4, provided that when $Y^1$ is a single bond, not all of $X^1$ in the number of m are 1-equivalent metal cations.

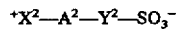

$$^+X^2—A^2—Y^2—SO_3^- \quad (II)$$

wherein $A^2$ is a divalent hydrocarbon group, $^+X^2$ is a secondary, tertiary or quaternary ammonium cation or a secondary, tertiary or quaternary phosphonium cation, and $Y^1$ is as defined above.

$$A^3—(^+X^3)_n \cdot {}_{(R—Y^1—SO_3^-)_n} \quad (III)$$

wherein $A^3$ is a hydrocarbon group having a valence of n, $^+X^3$ is a secondary, tertiary or quaternary ammonium cation or a secondary, tertiary or quaternary phosphonium cation, R is a monovalent hydrocarbon group, n is an integer of 2 to 4, and $Y^1$ is as defined above.

$$A^5—Ad^1—A^4—(Ad^2—A^5)_k \quad (IV)$$

wherein $A^5$ is a monovalent or divalent hydrocarbon group, $A^4$ is a divalent hydrocarbon group, each of $Ad^1$ and $Ad^2$ is independently is an acid anhydride group selected from —$SO_2$—O—$SO_2$—, —$SO_2$—O—CO— or —CO—O—$SO_2$—, and k is 0 or 1, provided that when k is 0, —$(Ad^2—A^5)_k$ is a hydrogen atom or a single bond between $A^4$ and $A^5$ (in which $A^5$ is a divalent hydrocarbon group or a single bond).

Specific examples of the compound of the above formula (I) include 2-phenyl-2-propyl dodecylbenzenesulfonate, 2-phenyl-2-butyl dodecylbenzenesulfonate, tetrabutylphosphonium octylsulfonate, tetrabutylphosphonium decylsulfonate, tetrabutylphosphonium benzenesulfonate, tetraethylphosphonium dodecylbenzenesulfonate, tetrabutylphosphonium dodecylbenzenesulfonate, tetrahexylphosphonium dodecylbenzenesulfonate, tetraoctylphosphonium dodecylbenzenesulfonate, decylammonium butylsulfate, decylammonium decylsulfate, dodecylammoniummethylsulfate, dodecylammonium ethylsulfate, dodecylmethylammonium methylsulfate, dodecyldimethylammonium tetradecylsulfate, tetradecyldimethylammoniummethylsulfate, tetramethylammonium hexylsulfate, decyltrimethylammonium hexadecylsulfate, tetrabutylammoniumdodecylbenzylsulfate, tetraethylammonium dodecylbenzylsulfate and tetramethylammonium dodecylbenzylsulfate.

Specific examples of the compound of the above formula (II) include

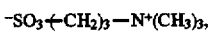

$$^-SO_3—(CH_2)_3—N^+(CH_3)_3,$$

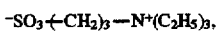

$$^-SO_3—(CH_2)_3—N^+(C_2H_5)_3,$$

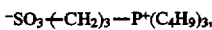

$$^-SO_3—(CH_2)_3—P^+(C_4H_9)_3,$$

-continued $^-SO_3\text{-}(CH_2)_3\text{-}P^+(C_6H_5)_3$, $^-SO_3\text{-}(CH_2)_{15}\text{-}N^+(C_2H_5)_3$, $^-SO_3\text{-}(CH_2)_{15}\text{-}P^+(C_6H_5)_3$, $^-SO_3\text{-}(CH_2)_{15}\text{-}P^+(C_4H_9)_3$.

Specific examples of the compound of the above formula (III) include

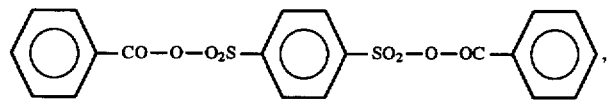

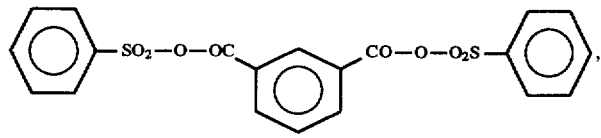

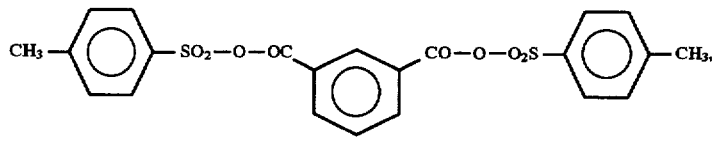

$[(C_4H_9)_3N^+\text{-}(CH_2)_{10}\text{-}N^+(C_4H_9)_3]\cdot(C_{12}H_{25}\text{-}\langle\bigcirc\rangle\text{-}SO_3^-)_2$ $[(CH_3)_3N^+\text{-}(CH_2)_{15}\text{-}N^+(CH_3)_3]\cdot(C_{15}H_{31}\text{-}SO_4^-)_2$ $[(C_4H_9)_3N^+\text{-}(CH_2)_{10}\text{-}N^+(C_4H_9)_3]\cdot(C_{15}H_{31}\text{-}SO_4^-)_2$

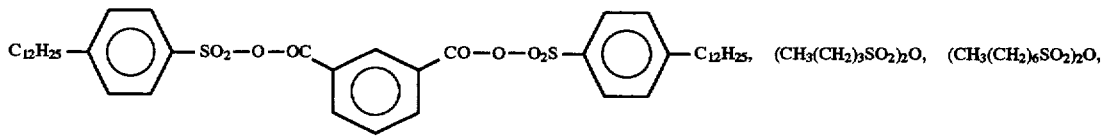

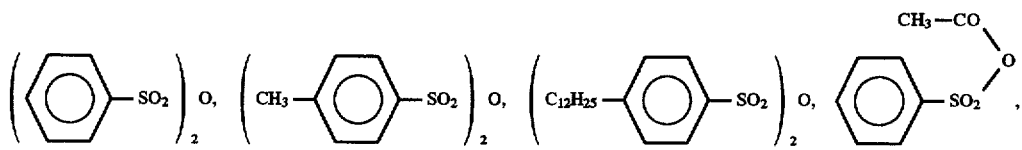

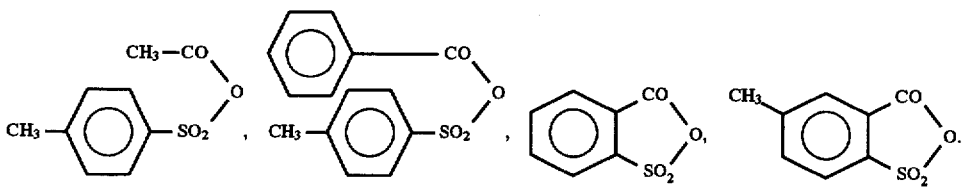

$[(C_4H_9)_3P^+\text{-}(CH_2)_{10}\text{-}P^+(C_4H_9)_3]\cdot(C_{15}H_{31}\text{-}SO_3^-)_2$.

Specific examples of the compound of the above formula (IV) include

Of the neutralizing agents of the above formulae (I) to (IV), the phosphonium or ammonium salt type neutralizing agents are particularly stable themselves at 200° C. or higher. When any one of these neutralizing agents is added, the catalyst for the polycondensation is promptly neutralized, and the intended polymer can be obtained.

In the process of the present invention, at least one neutralizing agent selected from the group consisting of the compounds of the above formulae (I) to (IV) is used in an amount of preferably 0.01 to 500 ppm, more preferably 0.01 to 300 ppm, particularly preferably 0.01 to 100 ppm, based on the polycarbonate formed after the terminal blocking reaction.

Further, the amount of the above neutralizing agent per mole of the catalyst for the polycondensation is preferably 0.5 to 50 mol.

The method of adding the neutralizing agent to the terminal-blocked polymer is not specially limited. For example, the neutralizing agent may be added to the polycarbonate as a reaction product while the polycarbonate is in a molten state, or it may be added to the polycarbonate after the polycarbonate is pelletized. In the former method, the neutralizing agent may be added while the terminal-blocked polymer is in a molten state in a reactor or while the polycarbonate as a reaction product is in a molten state in an extruder, and then, the polycarbonate is molded and pelletized through an extruder. Or, the polycarbonate may be obtained by adding the neutralizing agent to the polycarbonate obtained by the terminal blocking reaction while it passes through a reactor and an extruder to be pelletized, and kneading these.

In the present invention, it is preferred to incorporate a known stabilizer to the reaction system in a molten state at any step before, during or after the terminal blocking. The stabilizer includes a sulfur-containing acidic compound and/ or a derivative formed of the acidic compound, a phenol-containing stabilizer, a thioether-containing stabilizer, a phosphorus-containing stabilizer, a hindered amine-containing stabilizer, an epoxy-containing stabilizer, a salicylic acid-containing ultraviolet absorbent, and benzotriazole-containing ultraviolet absorbent.

The above stabilizers may be used alone or in combination.

The production of the polymer by the polycondensation of the aromatic dihydroxy compound and the diphenylcarbonate can be carried out under known general conditions.

Specifically, in a first step, the aromatic dihydroxy compound and the diphenylcarbonate are allowed to react with each other at a temperature between 80° C. and 250° C., preferably 100° C. and 230° C., more preferably 120° C. and 190° C., for 0.5 to 5 hours, preferably 1 to 4 hours, more preferably 1.5 to 3 hours, under reduced pressure. Then, the reaction of the aromatic dihydroxy compound and the diphenylcarbonate is continued by increasing the reaction temperature with increasing the vacuum degree of the reaction system, and in a final step, the polycondensation reaction of the aromatic dihydroxy compound and the diphenylcarbonate is carried out under a reduced pressure of not more than 5 Torr, preferably not more than 1Torr, at a temperature between 240° C. and 320° C.

In the present invention, before the terminal blocking reagent is added, the concentration of terminal hydroxyl groups of the polycarbonate, based on the total terminal amount, is preferably adjusted to at least 20 mol %, preferably at least 30 mol %, more preferably at least 40 mol %. By this adjustment, the specific terminal group can be introduced at a high ratio, and the modification effect on the polymer can improve. Generally, the present invention can be advantageously carried out when the concentration of terminal hydroxyl groups based on the total terminal amount is in the range of from 30 to 95 mol %. The molar amount of terminal hydroxyl groups based on a given amount of the polymer can be determined on the basis of a conventional method based on $^1$-NMR. Further, the concentration of terminal hydroxyl groups of the polymer can be also controlled on the basis of the amount ratio of the aromatic dihydroxy compound and the diphenylcarbonate charged as raw materials.

In the present invention, an apparatus for feeding the terminal blocking reagent and a reactor for carrying out the terminal blocking reaction are not specially limited.

The method of adding the terminal blocking reagent is not specially limited. The terminal blocking reagent may be added in the form of a solid, a melt or a solution thereof in a solvent. Further, the terminal blocking reagent may be added in a predetermined amount once, or it may be separated into predetermined amounts and added several times, so long as it is added after the intrinsic viscosity of the polymer reaches 0.3 de/g.

That is, the terminal blocking reagent is added after the polymer has an intrinsic viscosity of at least 0.3 dl/g.

In the present invention, advantageously, the content of chlorine (it means an active chlorine. Chlorine atom covalently bonding to polymer molecule is excluded.) in the polymer (prepolymer) before the terminal blocking is controlled so that it is preferably at a low level of not more than 10 ppm, more preferably at a level of not more than 5 ppm.

When the chlorine content is larger than the above limit, the activity of the catalyst for the terminal blocking is liable to decrease, which results in the difficulty in rapidly and fully achieving the terminal blocking.

Further, when the chlorine content is large, undesirably, the chlorine affects the hue and stability of the polymer.

The chlorine content in the prepolymer can be maintained at a low level by controlling the chlorine content in raw materials so that it is at a low level.

Further, in the present invention, advantageously, the content of iron in the polycarbonate before the terminal blocking is controlled so that it is at a low level, preferably at a level of not more than 1 ppm, more preferably at a level of not more than 0.7 ppm.

When the iron content is larger than the above limit, the activity of the catalyst for the terminal blocking is liable to decrease, which results in the difficulty in rapidly and fully achieving the terminal blocking. Further, when the iron content is large, undesirably, the iron affects the hue and stability of the polymer.

The iron content in the prepolymer can be maintained at a low level by controlling the iron content in raw materials so that it is at a low level and by preventing the inclusion of iron in the entire production process.

After the terminal blocking reagent is added, the reaction mixture preferably passes at least one time through the condition of reduced pressure for removing phenols formed by the reaction. Specifically, the pressure is not more than 100 Torr, preferably not more than 50 Torr, more preferably not more than 10 Torr. Generally, the present invention is preferably carried out under a pressure in the range of from 0.01 to 100 Torr.

The reaction temperature after the addition of the terminal blocking reagent is generally in the range of from 250° to 360° C., preferably in the range of from 260° to 340° C. When the temperature is lower than the above lower limit, undesirably, the polymer is not melted. When it is higher than the above upper limit, undesirably, the polymer is decomposed and colored. The reaction temperature is generally 1 to 30 minutes, preferably 1 to 20 minutes, and the reaction can be completed in 1 to 15 minutes as required.

In the present invention, the terminal-blocked polymer can be controlled so that the concentration of residual phenolic compound therein is at a low level.

The concentration of residual phenols in the terminal-blocked polymer is not more than 300 ppm, preferably not more than 200 ppm. When the concentration of residual phenols is greater than the above value, undesirably, the polymer is liable to have a decreased molecular weight or to be colored.

The above polycondensation may be carried out by a continuous method or a batch method. The reactor used for the above reaction may have the form of any one of a vessel, a tube or a column.

In the present invention, the polycarbonate obtained by the terminal blocking reaction may contain a heat stabilizer, an ultraviolet absorbent, a mold releasing agent, a colorant, an antistatic agent, a lubricant, an anti-fogging agent, a natural oil, a synthetic oil, a wax, an organic filler and an inorganic filler, which are generally used, so long as the object of the present invention is not impaired.

Further, studies of the present inventors have also revealed the following. Some compounds including some specific compounds included in the compound of the above formula (1) can advantageously terminal-block two molecules of the polycarbonate with one molecule, and they consequently have the activity of remarkably improving the polymerization degree of the polycarbonate, i.e., polymerization-promoting activity.

Therefore, according to the present invention, second, there is similarly provided a process for the production of a polycarbonate having an increased intrinsic viscosity by melt-polycondensing an aromatic dihydroxy compound and diphenylcarbonate, the process comprising adding a compound of the formula (2),

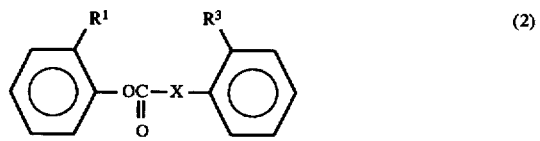

(2)

wherein $R^1$ is a chlorine atom, methoxycarbonyl group or ethoxycarbonyl group, X is an oxygen atom or a group of the following formula,

in which R is an alkylene group having 1 to 30 carbon atoms or an arylene group having 6 to 30 carbon atoms, and $R^3$ is a chlorine atom, methoxycarbonyl group or ethoxycarbonyl group, after a polycarbonate formed has an intrinsic viscosity of at least 0.3 dl/g, to form a polycarbonate having an intrinsic viscosity greater than the intrinsic viscosity of the polycarbonate formed before the addition by more than 0.1 dl/g.

In the above formula (2), $R^1$ is a chlorine atom, methoxycarbonyl group or ethoxycarbonyl group, X is an oxygen atom or a group of the formula: —R—COO— (in which R is an alkylene group having 1 to 30 carbon atoms or an arylene group having 6 to 30 carbon atoms), and $R^3$ is chlorine, methoxycarbonyl group or ethoxycarbonyl group.

The alkylene group having 1 to 30 carbon atoms and an arylene group having 6 to 30 carbon atoms include those described concerning the above formula (1).

The compound of the above formula (2) diarylcarbonates such as bis(2-chlorophenyl)carbonate, 2-chlorophenyl-2'-methoxycarbonylphenylcarbonate, 2-chlorophenyl-2'-ethoxycarbonylphenylcarbonate, bis(2-methoxycarbonylphenyl)carbonate, 2-methoxycarbonylphenyl-2'-ethoxycarbonylphenylcarbonate and bis(2-ethoxycarbonylphenyl)carbonate; diphenyl esters of aliphatic dicarboxylic acids such as bis(2-chlorophenyl) maronate, 2-chlorophenyl 2'-methoxycarbonylphenylmaronate, 2-chlorophenyl 2'-emethycarbonylphenylmaronate, bis(2-methoxycarbonylphenyl)maronate, 2-methoxycarbonylphenyl 2'-ethoxycarbonylphenylmaronate, bis(2'-ethoxycarbonylphenyl)maronate, bis(2-chlorophenyl)succinate, bis(2-methoxycarbonylphenyl)succinate, bis(2-ethoxycarbonylphenyl)succinate, bis(2-chlorophenyl)gultarate, bis(2-methoxcabrbonylphenyl)glutarate, bis(2-ethoxycarbonylphenyl)glutarate, bis(2-chlorophenyl)adipate, bis(2-methoxycarbonylphenyl)adipate, di(2-ethoxycarbonylphenyl)adipate, bis(2-chlorophenyl)pimelinate, bis(2-methoxycarbonylphenyl)pimelinate, bis(2-ethoxycarbonylphenyl)pimelinate, bis(2-chlorophenyl)suberinate, bis(2-methoxycarbonylphenyl)suberinate, bis(2-ethoxycarbonylphenyl)suberinate, bis(2-chlorophenyl)azelate, bis(2-methoxycarbonylphenyl)azelate, bis(2-ethoxycarbonylphenyl)azelate, bis(2-chlorophenyl)sebacate, bis(2-methoxycarbonylphenyl)sebacate, bis(2-ethoxycarbonylphenyl)sebacate, bis(2'chlorophenyl) decane-1,10-dicarboxylate, bis(2'-methoxycarbonylphenyl) decane-1,10-dicarboxylate, bis(2'-ethoxycarbonylphenyl) decane-1,10-dicarboxylate, bis(2'-methoxycarbonylphenyl) hexadecane-1,10-dicarboxylate, bis(2'-methoxycarbonylphenyl)eicosane-1,20-dicarboxylate, bis (2'-methoxycarbonylphenyl)pentacosane-1,25-dicarboxylate and bis(2'-methoxycarbonylphenyl) triacontane-1,30-dicarboxylate; and diphenyl esters of aromatic dicarboxylic acids such as bis(2-chlorophenyl) terephthalate, bis(2-methoxycarbonylphenyl)terephthalate, bis(2-ethoxycarbonylphenyl)terephthalate, 2-chlorophenyl-2'-methoxycarbonylphenylterephthalate, bis(2-chlorophenyl)isophthalate, bis(2-methoxycarbonylphenyl)isophthalate, bis(2-ethoxycarbonylphenyl)isophthalate, bis (2-chlorophenyl)terephthalate, bis(2-methoxycarbonylphenyl)terephthalate, bis(2-ethoxycarbonylphenyl)terephthalate, bis(2-chlorophenyl) naphthalenedicarboxylate, bis(2-methoxycarbonylphenyl) naphthalenedicarboxylate, bis(2-ethoxycarbonylphenyl) napthalenedicarboxylate, bis(2-methoxycarbonylphenyl) biphenyldicarboxylate, bis(2-methoxycarbonylphenyl) toluenedicarboxylate, bis(2-methoxycarbonylphenyl) cumenedicarboxylate and bis(2-methoxycarbonylphenyl) anthracenedicarboxylate.

Among these, preferred are bis(2-methoxycarbonylphenyl)terephthalate, bis(2-ethoxycarbonylphenyl)terephthalate, bis(2-methoxycarbonylphenyl)isophthalate, bis(2-methoxycarbonylphenyl)carbonate and bis(2-ethoxycarbonylphenyl)isophthalate.

The polymerization promoter of the above formula (2) is added to the polycarbonate whose intrinsic viscosity has reached at least 0.3 dl/g, and the resultant polycarbonate has an intrinsic viscosity greater than the intrinsic viscosity of the polycarbonate formed before the addition by more than 0.1 dl/g.

The polymerization promoter of the formula (2) is added in an amount of preferably about 0.3 to about 0.7 mol, more preferably about 0.4 to about 0.6 mol, particularly preferably about 0.45 mol to about 0.55 mol, per mole of the terminal hydroxyl group amount of the polycarbonate to which the polymerization promoter is to be added.

When the polymerization promoter is added to the polycarbonate, it reacts with terminal OH group (—OH) of the polycarbonate to couple two polycarbonate molecules as shown in the following reaction scheme.

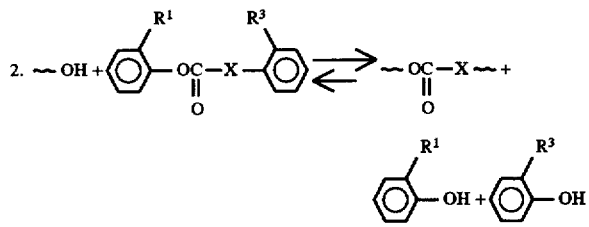

As shown in the above reaction scheme, the reaction forms two molecules of 2-substituted phenols from the polymerization promoter. For expediting the coupling at high yields, therefore, it is preferred to carry out the reaction with distilling off the formed 2-substituted phenols.

At a time when the coupling is completed, there is formed a polycarbonate having an intrinsic viscosity, preferably, greater than 0.4 dl/g and less than 1.0 dl/g, more preferably from 0.41 to 0.8 dl/g.

It should be understood that those descriptions concerning the process of the present invention using the terminal blocking reagent can be directly applied to the above process of the present invention using the polymerization promoter, with regard to the catalyst for polycondensation, the neutralizing agent, polycondensation conditions, and the like, which are omitted concerning the process using the polymerization promoter.

EXAMPLES

The present invention will be explained in detail hereinafter with reference to Examples, while the present invention shall not be limited by Examples.

In Examples, polymers were measured for physical properties by the following methods.

(i) Intrinsic viscosity [η]

Measured with a Ubbelohde's viscometer in methylene chloride at 20° C.

(ii) Terminal hydroxyl group concentration

A sample (0.02 g) was dissolved in 0.4 ml of chloroform-d, and measured for terminal hydroxyl group and terminal phenyl group at 20° C. with 1H-NMR (EX-270, supplied by Nippon Denshi KK). The terminal hydroxyl group concentration was determined on the basis of the following equation.

Terminal hydroxyl group concentration (%) =
(terminal hydroxyl group concentration)/(total number of terminals) × 100

(iii) Residual phenols:

A sample (1.0 g) was dissolved in methylene chloride, and the mixture was added to methanol which was 10 times as much as the mixture. Insolubles were placed in a Soxhlet's extractor, methanol was used as an extracting solvent, and residual phenols were extracted for 12 hours. Methanol as a precipitating solvent and methanol as an extracting solvent were combined, and residual phenols were quantitatively determined by high-performance liquid chromatography. The amount of the residual phenols is expressed as a concentration (ppm) of residual phenols in a polymer.

(iv) Residual Cl amount, Fe amount:

Quantitatively determined by elemental analysis.

(v) Hue: Visually evaluated.

(vi) Stability of polymer:

Evaluated on the basis of IV (intrinsic viscosity) change ratio and a change in hue after aging under heat. The aging under heat was carried out by heating a polymer at 340° C. for 15 minutes.

(vii) Releasability from metal surface:

A polymer containing a neutralized catalyst was injection-molded with an injection molding machine (Meiki M50-B model) under conditions of a cylinder temperature of 340° C., a mold temperature of 70° C., an injection time of 10 seconds and a cooling time of 40 seconds. The mold was capable of forming a plate having a size of a general name card and a thickness of 2 mm. When the injection molding was carried out 100 shots, the molded plates were evaluated for releasability on the basis of the following ratings.

⊚: Excellent (no problem whatsoever)

○: Good (In some shots, plates showed some difficulty in releasing themselves from the mold, but there was no essential problem).

Δ: Slightly poor: (In some shots, plates were not released from the mold, and manually released.)

X: Poor: Plates were often manually released.

(viii) Stability of polymer under high temperature and high humidity

A polymer was kept at a temperature of 120° C. under a saturated vapor pressure for 15 hours and thereafter, was measured for terminal hydroxyl group in the same manner as in above (ii).

EXAMPLES 1–18

A reactor equipped with a distillation apparatus and a pressure reducing apparatus was charged with 228 parts by weight of bisphenol A, 220 parts by weight of diphenylcarbonate and a catalyst shown in Tables 1 to 9 in an amount shown in Tables 1 to 9. Nitrogen was flushed, and then the above materials were melted. The mixture was stirred for 30 minutes, the temperature in the reactor was increased to 180° C., the mixture was allowed to react at 100 mmHg for 30 minutes, and formed phenols were distilled off.

Then, while the temperature in the reactor was increased to 200° C., the pressure in the reactor was decreased. The reaction mixture was allowed to react at 50 mmHg for 30 minutes with distilling off phenols.

The temperature in the reactor was increased to 220° C. and the pressure in the reactor was decreased to 30 mmHg. At this temperature and this pressure, the reaction mixture was allowed to react for 30 minutes. Further, the temperature-increase and the pressure-decrease were repeated up to 240° C. and 10 mmHg, 260° C. and 1 mmHg, and 270° C. and not higher than 1 mmHg in the same manner as above, and the reaction was continued in the same manner as above.

Finally, at the above final temperature and the above final pressure, the polymerization was continued for 1 hour, and when the formed polycarbonate showed an intrinsic viscosity of about 0.35, part of the polymer was taken, and a terminal blocking reagent shown in Tables 1 to 9 in an amount shown in Tables 1 to 9 was added. Then, the reaction was continued at 270° C. at not higher than 1 mmHg for 5 minutes to carry out a terminal blocking reaction.

Then, while the reaction mixture was in a molten state, a catalyst neutralizing agent shown in Table 1 to 9 in an amount shown in Table 1 to 9 was added, and then the reaction was continued at 270° C. at 10 mmHg or lower for 10 minutes.

Polymers obtained before the terminal blocking (before the addition of terminal blocking reagent) in the above procedures and polymers obtained after the terminal blocking and the neutralization of the catalyst (after the addition of terminal blocking reagent) in the above procedures were measured for a terminal hydroxyl group concentration, a concentration of residual unreacted phenols, an intrinsic viscosity [η], a Cl content and an Fe content, and further evaluated for a hue.

Further, the polymers obtained after the neutralization of the catalyst were evaluated for stability.

Further, the polymers obtained in Examples 13 to 18 were also evaluated for mold releasability.

Tables 1 to 9 show the results of the above measurements and evaluations.

In Tables 1 to 9, abbreviations have the following meanings.

BpA-Na: Na salt of bisphenol A
TMAH: tetramethylammonium hydroxide
BpA: bisphenol A Further, the polymers obtained in Examples 1, 2, 5, 6 and 11 were also evaluated for terminal hydroxyl group concentration after the wettability test. The results are shown in Table 12.

TABLE 1

|   |   | Example 1 | Example 2 |
|---|---|---|---|
| Catalyst | Kind | BPA-Na/TMAH | BPA-Na/TMAH |
|   | Amount ($\times 10^{-6}$ mol/BPA) | 2/100 | 2/100 |
| Terminal blocking reagent | Kind | (COOCH₃ structure) | (COOCH₂CH₃ structure) |
|   | Amount (mol/—OH group) | 1.0 | 1.0 |
| Catalyst neutralizing agent | Kind | TBP-DBS | TBP-DBS |
|   | Amount ($\times 10^{-6}$ mol/BPA) | 4 | 4 |
| Polymer physical properties | Intrinsic viscosity [η] bef. ad./aft. ad. | 0.350/0.354 | 0.346/0.349 |
|   | Terminal hydroxyl group concentration (%) bef. ad./aft. ad. | 53/4 | 52/6 |
|   | Residual phenolic compound (ppm) bef. ad./aft. ad. | 210/180 | 220/190 |
|   | Cl content (ppm) bef. ad./aft. ad. | 3/3 | 3/3 |
|   | Fe content bef. ad./aft. ad. | 0.1/0.1 | 0.1/0.1 |
|   | Hue after addition | almost colorless | almost colorless |
|   | Stability Rate of change |   |   |
|   | in IV: | 2 | 2 |
|   | Hue: | almost no change | almost no change |
|   | Mold releasability | — | — | bef. ad./aft. ad. = before addition/after addition
TBP-DBS: Tetrabutylphosphonium dodecylbezenesulfonate

TABLE 2

|   |   | Example 3 | Example 4 |
|---|---|---|---|
| Catalyst | Kind | BPA-Na/TMAH | BPA-Na/TMAH |
|   | Amount ($\times 10^{-6}$ mol/BPA) | 2/100 | 2/100 |

TABLE 2-continued

| | | Example 3 | Example 4 |
|---|---|---|---|
| Terminal blocking reagent | Kind | 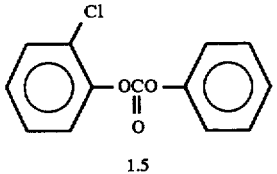 | 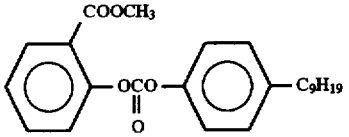 |
| | Amount (mol/—OH group) | 1.5 | 1.0 |
| Catalyst neutralizing agent | Kind | TBA-DBS | TBP-DBS |
| | Amount ($\times 10^{-6}$ mol/BPA) | 4 | 4 |
| Polymer physical properties | Intrinsic viscosity [η] bef. ad./aft. ad. | 0.359/0.362 | 0.346/0.349 |
| | Terminal hydroxyl group concentration (%) bef. ad./aft. ad. | 53/10 | 52/5 |
| | Residual phenolic compound (ppm) bef. ad./aft. ad. | 220/210 | 220/190 |
| | Cl content (ppm) bef. ad./aft. ad. | — | 3/3 |
| | Fe content bef. ad./aft. ad. | — | 0.1/0.1 |
| | Hue after addition | almost colorless | almost colorless |
| | Stability Rate of change | | |
| | in IV: | — | 2 |
| | Hue: | — | almost no change |
| | Mold releasability | — | — | bef. ad./aft. ad. = before addition/after addition
TBP-DBS: Tetrabutylphosphonium dodecylbezenesulfonate
TBA-DBS: Tetrabutylammonium dodecylbezenesulfonate

TABLE 3

| | | Example 5 | Example 6 |
|---|---|---|---|
| Catalyst | Kind | BPA-Na/TMAH | $Na_2GeO_3$/TMAH |
| | Amount ($\times 10^{-6}$ mol/BPA) | 2/100 | 2/100 |
| Terminal blocking reagent | Kind | 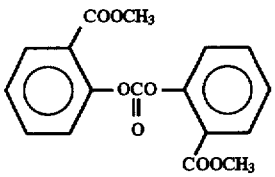 | 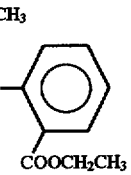 |
| | Amount (mol/—OH group) | 1.0 | 1.0 |
| Catalyst neutralizing agent | Kind | TBP-DBS | TBP-DBS |
| | Amount ($\times 10^{-6}$ mol/BPA) | 4 | 4 |
| Polymer physical properties | Intrinsic viscosity [η] bef. ad./aft. ad. | 0.345/0.355 | 0.348/0.353 |
| | Terminal hydroxyl group concentration (%) bef. ad./aft. ad. | 52/2 | 53/4 |
| | Residual phenolic compound (ppm) bef. ad./aft. ad. | — | — |
| | Cl content (ppm) | 3/3 | 3/3 |

TABLE 3-continued

| | Example 5 | Example 6 |
|---|---|---|
| bef. ad./aft. ad. Fe content | 0.1/0.1 | 0.1/0.1 |
| bef. ad./aft. ad. Hue | almost colorless | almost colorless |
| after addition Stability Rate of change | | |
| in IV: | 2 | 2 |
| Hue: | almost no change | almost no change |
| Mold releasability | — | — | bef. ad./aft. ad. = before addition/after addition
TBP-DBS: Tetrabutylphosphonium dodecylbezenesulfonate

TABLE 4

| | | Example 7 | Example 8 |
|---|---|---|---|
| Catalyst | Kind | BPA-Na/TMAH | $Na_2GeO_3/GeO_2$TMAH |
| | Amount ($\times 10^{-6}$ mol/BPA) | 2/100 | 2/5/100 |
| Terminal blocking reagent | Kind | (structure with COOCH$_3$ groups) | (structure with COOCH$_3$ groups) |
| | Amount (mol/—OH group) | 1.0 | 1.0 |
| Catalyst neutralizing agent | Kind | TBP-DBS | TBP-DBS |
| | Amount ($\times 10^{-6}$ mol/BPA) | 4 | 4 |
| Polymer physical properties | Intrinsic viscosity [η] bef. ad./aft. ad. | 0.350/0.353 | 0.348/0.349 |
| | Terminal hydroxyl group concentration (%) bef. ad./aft. ad. | 48/6 | 49/16 |
| | Residual phenolic compound (ppm) bef. ad./aft. ad. | — | — |
| | Cl content (ppm) bef. ad./aft. ad. | 3/3 | 3/3 |
| | Fe content bef. ad./aft. ad. | 0.1/0.1 | 0.1/0.1 |
| | Hue bef. ad./aft. ad. | almost colorless | almost colorless |
| | Stability Rate of change | | |
| | in IV: | 2 | 2 |
| | Hue: | almost no change | almost no change |
| | Mold releasability | — | — | bef. ad./aft. ad. = before addition/after addition
TBP-DBS: Tetrabutylphosphonium dodecylbezenesulfonate

TABLE 5

| | | Example 9 | Example 10 |
|---|---|---|---|
| Catalyst | Kind | BPA-Na/TMAH | BPA-Na/TMAH |
| | Amount ($\times 10^{-6}$ mol/BPA) | 2/100 | 2/100 |
| Terminal blocking reagent | Kind | 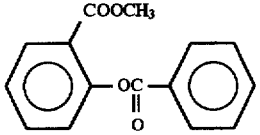 | 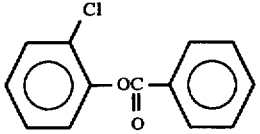 |
| | Amount (mol/—OH group) | 1.0 | 1.2 |
| Catalyst neutralizing agent | Kind | TBP-DBS | TBP-DBS |
| | Amount ($\times 10^{-6}$ mol/BPA) | 4 | 4 |
| Polymer physical properties | Intrinsic viscosity [η] bef. ad./aft. ad. | 0.351/0.353 | 0.353/0.354 |
| | Terminal hydroxyl group concentration (%) bef. ad./aft. ad. | 52/12 | 53/15 |
| | Residual phenolic compound (ppm) bef. ad./aft. ad. | 210/200 | 220/220 |
| | Cl content (ppm) bef. ad./aft. ad. | 3/3 | — |
| | Fe content bef. ad./aft. ad. | 0.1/0.1 | — |
| | Hue after addition | almost colorless | almost colorless |
| | Stability Rate of change | | |
| | in IV: | 3 | — |
| | Hue: | almost no change | — |
| | Mold releasability | — | — | bef. ad./aft. ad. = before addition/after addition
TBP-DBS: Tetrabutylphosphonium dodecylbezenesulfonate

TABLE 6

| | | Example 11 | Example 12 |
|---|---|---|---|
| Catalyst | Kind | BPA-Na/TMAH | BPA-Na/TMAH |
| | Amount ($\times 10^{-6}$ mol/BPA) | 2/100 | 2/100 |
| Terminal blocking reagent | Kind | 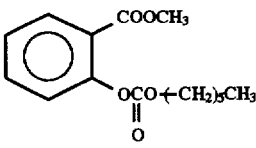 | 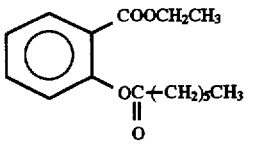 |
| | Amount (mol/—OH group) | 0.8 | 1.0 |
| Catalyst neutralizing agent | Kind | TBA-DBS | TBA-DBS |
| | Amount ($\times 10^{-6}$ mol/BPA) | 4 | 4 |
| Polymer physical properties | Intrinsic viscosity [η] bef. ad./aft. ad. | 0.348/0.352 | 0.351/0.352 |
| | Terminal hydroxyl group concentration (%) bef. ad./aft. ad. | 48/12 | 49/18 |
| | Residual phenolic compound (ppm) bef. ad./aft. ad. | 210/190 | 220/220 |

TABLE 6-continued

|  | Example 11 | Example 12 |
|---|---|---|
| Cl content (ppm) bef. ad./aft. ad. | 3/3 | 3/3 |
| Fe content bef. ad./aft. ad. | 0.1/0.1 | 0.1/0.1 |
| Hue after addition | almost colorless | almost colorless |
| Stability Rate of change | | |
| in IV: | 3 | 3 |
| Hue: | almost no change | almost no change |
| Mold releasability | — | — | bef. ad./aft. ad. = before addition/after addition
TBA-DBS: Tetrabutylammonium dodecylbezenesulfonate

TABLE 7

|  |  | Example 13 | Example 14 |
|---|---|---|---|
| Catalyst | Kind | BPA-Na/TMAH | BPA-Na/TMAH |
|  | Amount ($\times 10^{-6}$ mol/BPA) | 2/100 | 2/100 |
| Terminal blocking reagent | Kind | 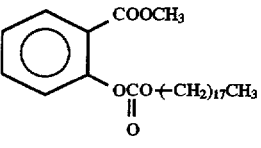 | 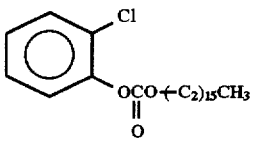 |
|  | Amount (mol/—OH group) | 1.0 | 1.0 |
| Catalyst neutralizing agent | Kind | TBP-DBS | TBP-DBS |
|  | Amount ($\times 10^{-6}$ mol/BPA) | 4 | 4 |
| Polymer physical properties | Intrinsic viscosity [η] bef. ad./aft. ad. | 0.352/0.346 | 0.351/0.347 |
|  | Terminal hydroxyl group concentration (%) bef. ad./aft. ad. | 48/7 | 50/10 |
|  | Residual phenolic compound (ppm) bef. ad./aft. ad. | — | — |
|  | Cl content (ppm) bef. ad./aft. ad. | — | — |
|  | Fe content bef. ad./aft. ad. | — | — |
|  | Hue after addition | almost colorless | almost colorless |
|  | Stability Rate of change | | |
|  | in IV: | — | — |
|  | Hue: | — | — |
|  | Mold releasability | ◉ | ◉ | bef. ad./aft. ad. = before addition/after addition
TBP-DBS: Tetrabutylphosphonium dodecylbezenesulfonate

TABLE 8

| | | Example 15 | Example 16 |
|---|---|---|---|
| Catalyst | Kind | BPA-Na/TMAH | BPA-Na/TMAH |
| | Amount ($\times 10^{-6}$ mol/BPA) | 2/100 | 2/100 |
| Terminal blocking reagent | Kind | 2-(COOCH₃)-phenyl-O-CO-(CH₂)₄-CO-CH₃ | 2-(COOCH₃)-phenyl-O-C(=O)-(CH₂)₁₅CH₃ |
| | Amount (mol/—OH group) | 1.0 | 1.1 |
| Catalyst neutralizing agent | Kind | TBP-DBS | TBP-DBS |
| | Amount ($\times 10^{-6}$ mol/BPA) | 4 | 4 |
| Polymer physical properties | Intrinsic viscosity [η] bef. ad./aft. ad. | 0.348/0.347 | 0.351/0.353 |
| | Terminal hydroxyl group concentration (%) bef. ad./aft. ad. | 50/10 | 50/18 |
| | Residual phenolic compound (ppm) bef. ad./aft. ad. | — | — |
| | Cl content (ppm) bef. ad./aft. ad. | — | — |
| | Fe content bef. ad./aft. ad. | — | — |
| | Hue after addition | almost colorless | almost colorless |
| | Stability Rate of change | | |
| | in IV: | — | — |
| | Hue: | — | — |
| | Mold releasability | ◎ | ○ | bef. ad./aft. ad. = before addition/after addition
TBP-DBS: Tetrabutylphosphonium dodecylbezenesulfonate

TABLE 9

| | | Example 17 | Example 18 |
|---|---|---|---|
| Catalyst | Kind | BPA-Na/TMAH | BPA-Na/TMAH |
| | Amount ($\times 10^{-6}$ mol/BPA) | 2/100 | 2/100 |
| Terminal blocking reagent | Kind | 2-(COOCH₃)-phenyl-O-CO-C₆H₄-C₉H₁₉ | 2-(COOCH₃)-phenyl-O-C(=O)-C₆H₄-C₉H₁₉ |
| | Amount (mol/—OH group) | 1.1 | 1.0 |
| Catalyst neutralizing agent | Kind | TBP-DBS | TBP-DBS |
| | Amount ($\times 10^{-6}$ mol/BPA) | 4 | 4 |
| Polymer physical properties | Intrinsic viscosity [η] bef. ad./aft. ad. | 0.349/0.351 | 0.348/0.351 |
| | Terminal hydroxyl group concentration (%) bef. ad./aft. ad. | 53/6 | 49/12 |
| | Residual phenolic compound (ppm) bef. ad./aft. ad. | — | — |
| | Cl content (ppm) | — | — |

TABLE 9-continued

|  | Example 17 | Example 18 |
|---|---|---|
| bef. ad./aft. ad. Fe content | — | — |
| bef. ad./aft. ad. Hue after addition Stability Rate of change | almost colorless | almost colorless |
| in IV: | — | — |
| Hue: | — | — |
| Mold releasability | ⊙ | ⊙ | bef. ad./aft. ad. = before addition/after addition
TBP-DBS: Tetrabutylphosphonium dodecylbezenesulfonate

EXAMPLES 19–21

Polymerization was carried out in the same manner as in Example 1. When a polycarbonate resin showed an intrinsic viscosity of about 0.45, part of the polymer was taken, and a polymerization promoter shown in Tables 10 and 11 was added. Then, the reaction was continued at 279° C. at not higher than 1 mmHg for 5 minutes to carry out a polymerization promoting reaction.

Then, while the polymer was in a molten state, a catalyst neutralizing agent shown in Tables 10 and 11 in an amount shown in Tables 10 and 11 was added, and then the reaction was continued at 270° C. at not higher than 10 mmHg for 10 minutes.

Polymers obtained before the promotion of the polymerization in the above procedures and polymers obtained after the neutralization of the catalyst in the above procedures were measured for an intrinsic viscosity $[\eta]$, a terminal hydroxyl group concentration, a concentration of residual phenols, a Cl content and an Fe content, and evaluated for a hue and stability.

The polymers obtained after the neutralization of the catalyst were also evaluated for polymer stability.

Tables 10 and 11 show the results.

TABLE 10

| | | Example 19 | Example 20 |
|---|---|---|---|
| Catalyst | Kind | BPA-Na/TMAH | BPA-Na/TMAH |
| | Amount ($\times 10^{-6}$ mol/BPA) | 2/100 | 2/100 |
| Terminal blocking reagent | Kind | [structure with COOCH₃ and OCO groups] | [structure with COOCH₃ groups] |
| | Amount (mol/—OH group) | 0.5 | 0.5 |
| Catalyst neutralizing agent | Kind | TBP-DBS | TBP-DBS |
| | Amount ($\times 10^{-6}$ mol/BPA) | 4 | 4 |
| Polymer physical properties | Intrinsic viscosity $[\eta]$ bef. ad./aft. ad. | 0.451/0.660 | 0.450/0.651 |
| | Terminal hydroxyl group concentration (%) bef. ad./aft. ad. | 50/5 | 49/6 |
| | Residual phenolic compound (ppm) bef. ad./aft. ad. | — | — |
| | Cl content (ppm) bef. ad./aft. ad. | 3/3 | 3/3 |
| | Fe content bef. ad./aft. ad. | 0.1/0.1 | 0.1/0.1 |
| | Hue after addition | almost colorless | almost colorless |

TABLE 10-continued

|  | Example 19 | Example 20 |
|---|---|---|
| Stability Rate of change | | |
| in IV: | 2 | 2 |
| Hue: | almost no change | almost no change | bef. ad./aft. ad. = before addition/after addition
TBP-DBS: Tetrabutylphosphonium dodecylbezenesulfonate

TABLE 11

|  |  | Example 21 |
|---|---|---|
| Catalyst | Kind | BPA-Na/TMAH |
|  | Amount ($\times 10^{-6}$ mol/BPA) | 2/100 |
| Terminal blocking reagent | Kind | ![structure: two benzene rings with COOCH3 substituents, linked by -OC(=O)-(CH2)4-C(=O)-O-] |
|  | Amount (mol/—OH group) | 0.5 |
| Catalyst neutralizing agent | Kind | TBP-DBS |
|  | Amount ($\times 10^{-6}$ mol/BPA) | 4 |
| Polymer physical properties | Intrinsic viscosity [η] bef. ad./aft. ad. | 0.449/0.520 |
|  | Terminal hydroxyl group concentration (%) bef. ad./aft. ad. | 51/24 |
|  | Residual phenolic compound (ppm) bef. ad./aft. ad. | — |
|  | Cl content (ppm) bef. ad./aft. ad. | 3/3 |
|  | Fe content bef. ad./aft. ad. | 0.1/0.1 |
|  | Hue after addition | almost colorless |
|  | Stability Rate of change | |
|  | in IV: | — |
|  | Hue: | — | bef. ad./aft. ad. = before addition/after addition
TBP-DBS: Tetrabutylphosphonium dodecylbezenesulfonate

TABLE 12

|  | Terminal hydroxyl-group concentration after test for stability under high temperature and high humidity (%) |
|---|---|
| Example No. 1 | 5 |
| Example No. 2 | 7 |
| Example No. 5 | 7 |
| Example No. 6 | 9 |
| Example No. 11 | 13 |

What is claimed is:

1. A process for the production of a terminal-blocked aromatic polycarbonate by melt-polycondensing an aromatic dihydroxy compound and diphenylcarbonate, the process comprising adding a compound of the formula (1),

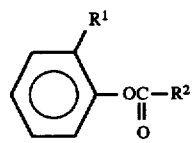

(1)

wherein $R^1$ is a chlorine atom, methyoxycarbonyl group or ethoxycarbonyl group, and $R^2$ is an alkyl group having 1 to 30 carbon atoms, an alkoxyl group having 1 to 30 carbon atoms, an aryl group having 6 to 30 carbon atoms or an aryloxy group having 6 to 30 carbon atoms, provided that the alkyl group having 1 to 30 carbon atoms and the alkoxy group having 1 to 30 carbon atoms is not substituted or is substituted with methoxycarbonyl group, ethoxycarbonyl group, (o-methoxycarbonylphenyl)oxycarbonyl group or (o-ethoxycarbonylphenyl)oxycarbonyl group and that the aryl group having 6 to 30 carbon atoms and the aryloxy group having 6 to 30 carbon atoms is not substituted or is substituted with methoxycarbonyl group, ethoxycarbonyl group, (o-methoxycarbonylphenyl)oxycarbonyl group, (o-ethoxycarbonylphenyl)oxycarbonyl group, cumyl group, an alkyl group having 1 to 30 carbon atoms or an alkoxy group having 1 to 30 carbon atoms, after a polycarbonate formed has an intrinsic viscosity of at least 0.3 dl/g, to form a terminal-blocked polycarbonate having an intrinsic viscosity which is greater than, or smaller than, the intrinsic viscosity of the polycarbonate formed before the addition of the formula (1) compound by not more than 0.1 dl/g.

2. The process according to claim 1, wherein the compound of the formula (1) is added in an amount of about 0.5 to about 2 mol based on 1 equivalent of terminal hydroxyl groups of the polycarbonate formed at a time of the addition.

3. The process according to claim 1, wherein the compound of the formula (1) is added, and then the polycarbonate is terminal-blocked with distilling off a phenolic compound of the formula (3), in which $R^1$ is as defined in the formula (1).

4. A process for the production of a polycarbonate having an increased intrinsic viscosity by melt- polycondensing an aromatic dihydroxy compound and diphenylcarbonate, the process comprising adding a compound of the formula (2),

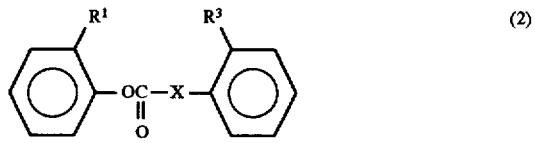

(2)

wherein $R^1$ is a chlorine atom, methoxycarbonyl group or ethoxycarbonyl group, X is an oxygen atom or a group of the following formula,

—R—COO— in which R is an alkylene group having 1 to 30 carbon atoms or an arylene group having 6 to 30 carbon atoms, and $R^3$ is a chlorine atom, methoxycarbonyl group or ethoxycarbonyl group, after a polycarbonate formed has an intrinsic viscosity of at least 0.3 dl/g, to form a polycarbonate having an intrinsic viscosity greater than the intrinsic viscosity of the polycarbonate formed before the addition of the formula (2) compound by more than 0.1 dl/g.

5. The process according to claim 4, wherein the compound of the formula (2) is added in an amount of about 0.3 to about 0.7 mol based on 1 equivalent of terminal hydroxyl groups of the polycarbonate formed at a time of the addition.

6. The process according to claim 4, wherein the compound of the formula (2) is added, and then the polcarbonate is increased in intrinsic viscosity with distilling off a phenolic compound of the formula (3),

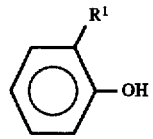

(3)

in which $R^1$ is as defined in the formula (2).

7. The process according to claim 1, wherein $R^1$ is as defined in formula (1) and $R^2$ is an alkoxy group having 1 to 30 carbon atoms or an aryloxy group having 6 to 30 carbon atoms, and wherein the $R^2$ group is not substituted or is substituted with a substituent specified for $R^2$ in formula (1).

8. The process according to claim 11, wherein $R^1$ is as defined in formula (1) and $R^2$ is an alkoxy group having 2 to 22 carbon atoms or an aryloxy group having 6 to 14 carbon atoms, and wherein the $R^2$ group is not substituted.

9. The process according to claim 1, wherein $R^1$ is as defined in formula (1) and $R^2$ is an alkyl group having 1 to 30 carbon atoms or an aryl group having 6 to 30 carbon atoms, and wherein the $R^2$ group is not substituted or is substituted with a substituent specified for $R^2$ in formula (1).

10. The process according to claim 13 wherein $R^1$ is as defined in formula (1) and $R^2$ is an alkyl group having 2 to 22 carbon atoms or an aryl group having 6 to 14 carbon atoms, and wherein the $R^2$ group is not substituted.

11. The process according to claim 4 wherein in the formula (2) X is an oxygen atom.

12. The process according to claim 4 wherein in the formula (2) X is a group of the formula —R—COO— and R is as defined in formula (2).

13. The process according to claim 4 wherein in the formula (2) X is a group of the formula —R—COO— and R is an alkylene group of 1 to 20 carbon atoms or an arylene group of 6 to 14 carbon atoms.

14. The process according to claim 1, wherein the compound of the formula (1) is a terminal blocking reagent for the melt-polycondensation reaction of the aromatic dihydroxy compound and the diphenyl carbonate compound.

15. The process according to claim 4, wherein the compound of formula (2) is a polymerization promoter for the melt-polycondensation reaction of the aromatic dihydroxy compound and the diphenyl carbonate compound.

* * * * *